United States Patent
Ha et al.

(10) Patent No.: US 12,421,930 B2
(45) Date of Patent: *Sep. 23, 2025

(54) FLOATING WAVE ENERGY POWER GENERATION DEVICE WITH ADJUSTABLE POSITION PENDULUM

(71) Applicants: Hyundai Motor Company, Seoul (KR); Kia Corporation, Seoul (KR)

(72) Inventors: Dong Hyun Ha, Seoul (KR); Jung Hun Choi, Hwaseong-si (KR); Jae Wung Jung, Bucheon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/822,683

(22) Filed: Aug. 26, 2022

(65) Prior Publication Data

US 2023/0193872 A1    Jun. 22, 2023

(30) Foreign Application Priority Data

Dec. 22, 2021 (KR) .......................... 10-2021-0185105

(51) Int. Cl.
| | |
|---|---|
| *F03B 13/16* | (2006.01) |
| *H02K 7/116* | (2006.01) |
| *H02K 7/18* | (2006.01) |
| *H02K 11/21* | (2016.01) |
| *B63B 35/44* | (2006.01) |

(52) U.S. Cl.
CPC .............. *F03B 13/16* (2013.01); *H02K 7/116* (2013.01); *H02K 7/1853* (2013.01); *H02K 11/21* (2016.01); *B63B 2035/4466* (2013.01); *F05B 2220/706* (2013.01)

(58) Field of Classification Search
None
See application file for complete search history.

(56) References Cited

U.S. PATENT DOCUMENTS

| 4,317,047 A | * | 2/1982 | de Almada | ........... F03B 13/141 |
| | | | | 416/86 |
| 4,438,343 A | * | 3/1984 | Marken | ................... F03B 13/20 |
| | | | | 60/507 |
| 11,585,316 B1 | * | 2/2023 | Ha | ...................... F03B 13/1805 |

(Continued)

*Primary Examiner* — Tulsidas C Patel
*Assistant Examiner* — S. Mikailoff
(74) *Attorney, Agent, or Firm* — MORGAN, LEWIS & BOCKIUS LLP

(57) ABSTRACT

The present disclosure provides a renewable energy generator including a roly-poly toy- or capsule-shaped housing floating in the water, a main generator unit, frame(s) fixed internally of the housing at intervals, a main rotation shaft for linking the main generator unit rotatably to the frame(s), and a controller for operating the pendulum by driving the main motor, and controlling the main generator unit to generate an electrical energy profit by using the housing behaving due to the pendulum operation. The main generator unit includes an internal housing, a pendulum moving inside the internal housing, a pendulum rotation shaft vertically connected to the pendulum and fixed to the internal housing, a main motor for converting kinetic energy of the pendulum into electrical energy, and a gear unit linked to the pendulum rotation shaft and transmitting the kinetic energy of the pendulum to the main motor.

5 Claims, 7 Drawing Sheets

(56) References Cited

U.S. PATENT DOCUMENTS

| | | | |
|---|---|---|---|
| 2011/0291418 A1* | 12/2011 | Ono | F03B 13/20 |
| | | | 290/53 |
| 2020/0347817 A1* | 11/2020 | Lee | H02K 5/10 |
| 2023/0151791 A1* | 5/2023 | Ha | F03B 13/26 |
| | | | 290/53 |
| 2023/0193872 A1* | 6/2023 | Ha | H02K 7/1853 |
| | | | 290/53 |
| 2023/0228241 A1* | 7/2023 | Ha | F03B 13/16 |
| | | | 290/53 |
| 2023/0265821 A1* | 8/2023 | Ha | F03B 13/14 |
| | | | 290/53 |

\* cited by examiner

— Controlled by main motors
Controlled by auxiliary motors

FLOATING WAVE ENERGY POWER GENERATION DEVICE WITH ADJUSTABLE POSITION PENDULUM

CROSS-REFERENCE TO RELATED APPLICATIONS

The present application claims priority to Korean Patent Application No. 10-2021-0185105, filed on Dec. 22, 2021, the entire contents of which is incorporated herein for all purposes by this reference.

BACKGROUND OF THE PRESENT DISCLOSURE

Field of the Present Disclosure

The present disclosure in some embodiments relates to a renewable energy generator and a control method therefor.

Description of Related Art

The statements in this section merely provide background information related to the present disclosure and do not necessarily from related art.

To produce electricity, various methods exist and are widely used, including thermal power generation using chemical energy of fossil fuels, hydroelectric power generation using the potential energy of water by forming dams, and nuclear power generation using nuclear fission of uranium.

However, in recent years, resource depletion, safety issues, and eco-friendly values are increasingly propelling renewable energy productions in proportion over the three major power generation sources. Renewable energy includes power generation using infinite energy sources such as solar power, solar heat, tidal power, wave power, wind power, and geothermal heat.

More than 70% of the earth's surface is the sea that borders different countries with large bodies of water making them good environmental candidates to take advantage of the infinite energy of the waters, which garners increasing interest in wave power generation. Wave power generation refers to the production of electrical energy by use of the periodic vertical motion of the water surface caused by waves.

Conventional wave power generation device is difficult to stably produce power by providing irregular horizontal and vertical motions in accordance with the movement of irregular waves. For example, the conventional device cannot produce electricity efficiently because it is difficult to stably generate electricity in response to the fluidic movements of the sea level.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a renewable energy generator including a housing shaped as a self-righting roly-poly toy or capsule floating in a body of water, a main generator unit, one or more frames fixed in the housing at predetermined intervals, a main rotation shaft coupling link the main generator unit to at least one of the one or more frames to be rotatable with respect to the one or more frames, and a controller. The main generator unit includes an internal housing, a pendulum provided to pivotally move inside the internal housing, a pendulum rotation shaft vertically connected to the pendulum and rotatably coupled to the internal housing, a main motor configured to convert the kinetic energy of the pendulum into electrical energy, and a gear unit coupled to the pendulum rotation shaft and configured to transmit the kinetic energy of the pendulum to the main motor. The controller is configured to operate the pendulum by driving the main motor and to control the main generator unit to produce an electrical energy profit by use of the behavior of the housing due to an operation of the pendulum.

According to at least an exemplary embodiment of the present disclosure, the present disclosure provides a method of generating renewable energy including the steps (not necessarily in the following order) of (i) determining a position and an attitude of a renewable energy generator shaped as a self-righting roly-poly toy or capsule configured to convert wave energy into electrical energy to produce electric power, (ii) determining whether a pendulum needs to operate internally of the renewable energy generator, and (iii) upon determining that the pendulum needs to operate, converting a main motor and an auxiliary motor internally of the renewable energy generator to a driving mode.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
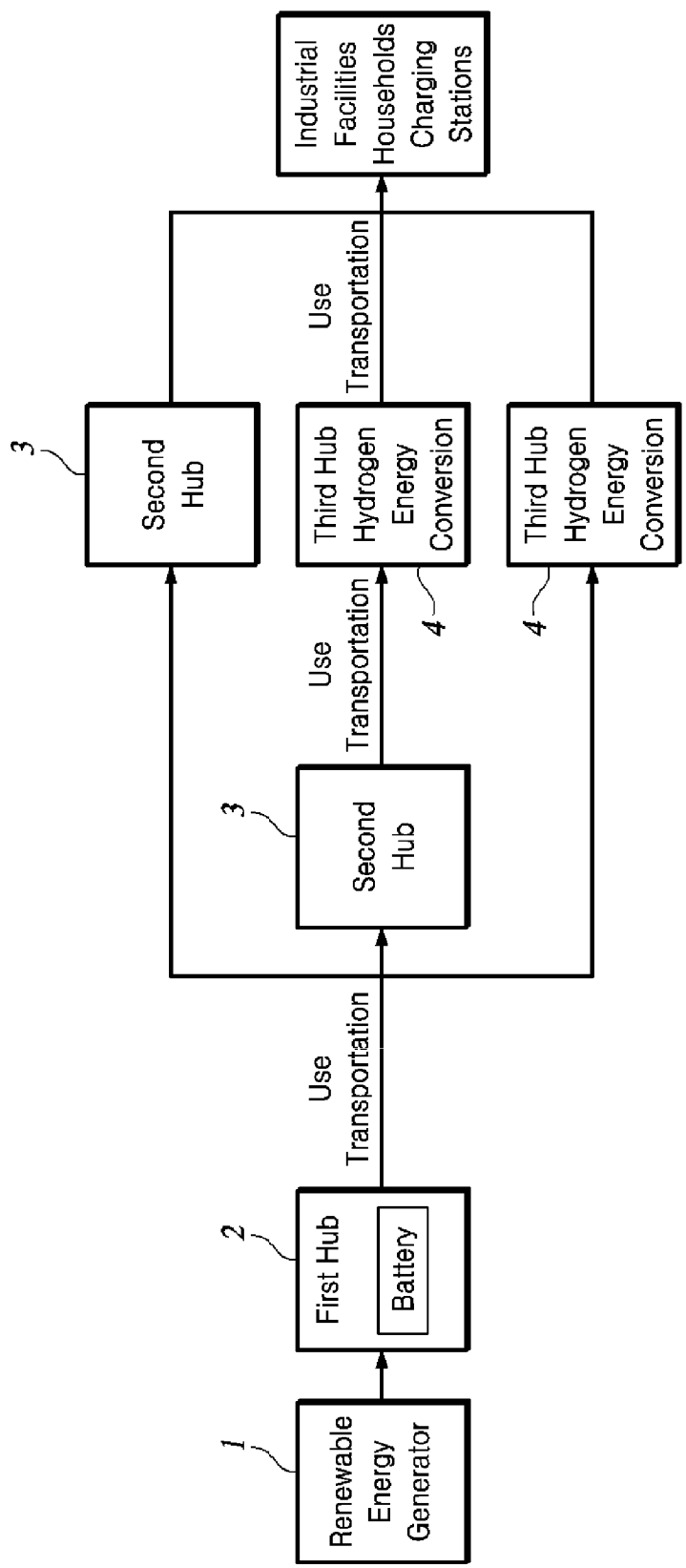
FIG. 1 is a block diagram of a renewable energy generation system using a renewable energy generator according to at least an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The present disclosure in at least an exemplary embodiment of the present disclosure is directed to providing a renewable energy generator that can generate electric power effectively with a pendulum operation and motors controlled by taking into account the intensity, speed, and frequency of the waves.

The issues to be solved by the present disclosure are not limited to those mentioned above, and other unmentioned issues to be solved will be clearly understood by those skilled in the art from the following description.

Hereinafter, various exemplary embodiments of the present disclosure will be described in detail with reference to the accompanying drawings. In the following description, like reference numerals designate like elements, although the elements are shown in different drawings. Furthermore, in the following description of various exemplary embodiments of the present disclosure, a detailed description of related known components and functions when considered to obscure the subject of the present disclosure will be omitted for clarity and for brevity.

Additionally, alphanumeric codes such as first, second, i), ii), (a), (b), etc., in numbering components are used solely for differentiating one component from the other but not to imply or suggest the substances, the order, or sequence of the components. Throughout the present specification, when parts "include" or "comprise" a component, they are meant to further include other components, not excluding thereof unless there is a particular description contrary thereto.

FIG. 1 is a block diagram of a renewable energy generation system using a renewable energy generator 1 according to at least an exemplary embodiment of the present disclosure.

As shown in FIG. 1, the renewable energy generation system may include the renewable energy generator 1, a first hub 2, second hubs 3, third hubs 4, transportation, and a battery in whole or in part.

Multiples of renewable energy generator 1 may be interconnected by use of a cable, and they may float in the coastal waters and distant seas. A plurality of renewable energy generators 1 may each be shaped as a roly-poly toy or capsule. The plurality of renewable energy generators 1 may each convert wave energy into electrical energy to produce electric power.

The renewable energy generator 1 may have a surface thereof provided with solar panels. The solar panels may be provided on the top portion of the surface of the renewable energy generator 1, for example, the portion which is not submerged in seawater. The renewable energy generator 1 cannot only convert wave energy into electrical energy but also convert solar energy into electrical energy by use of solar panels.

The first hub 2 may be positioned to be surrounded by the plurality of renewable energy generators 1. The first hub 2 may be cabled to the plurality of renewable energy generators 1 and may receive electrical energy therefrom. The first hub 2 may receive and store electrical energy from the renewable energy generators 1. The electrical energy transferred to the first hub 2 may charge a battery and transportation coupled to the first hub 2. In the instant case, the transportation may be an unmanned aerial vehicle (UAV), an unmanned ship, a drone, or the like.

The second hubs 3 may each be positioned to be surrounded by a plurality of first clusters including the first hub 2. The third hubs 4 may each be positioned to be surrounded by a plurality of second clusters including the second hub 3.

The transportation may deliver battery and electrical energy between the first hub 2, the second hubs 3, and the third hubs 4 to each other. Additionally, the transportation may deliver the battery and electrical energy to the first hub 2, the second hubs 3, the third hubs 4, and a separate place located on the ground. Here, the separate place may be present and future mobility means such as an electric vehicle (EV), purpose-built vehicle (PBV), urban air mobility (UAM), robot, their electric charging stations, households, industrial facilities, etc. For example, with Vehicle To Grid (V2G) technology, a rechargeable eco-friendly vehicle may be linked to a power grid to use surplus power as provided by the present disclosure. The eco-friendly vehicle may work as a moving energy storage system (ESS) by use of the power grid to first charge the vehicle and feed the remaining electricity back to the power grid after the vehicle operation.

The renewable energy generation system can convert electrical energy into hydrogen energy and transfer the converted hydrogen energy. When energy is stored in the first hub 2 to the third hubs 3 for a long time, a large amount of energy (1 TWh or more) may be stored. For large-capacity energy storage, hydrogen energy is a more suitable form of energy than electrical energy. Additionally, because hydrogen energy loses less than electrical energy during long-distance transport, hydrogen energy is suitable for international transport of energy.

Figure 2:
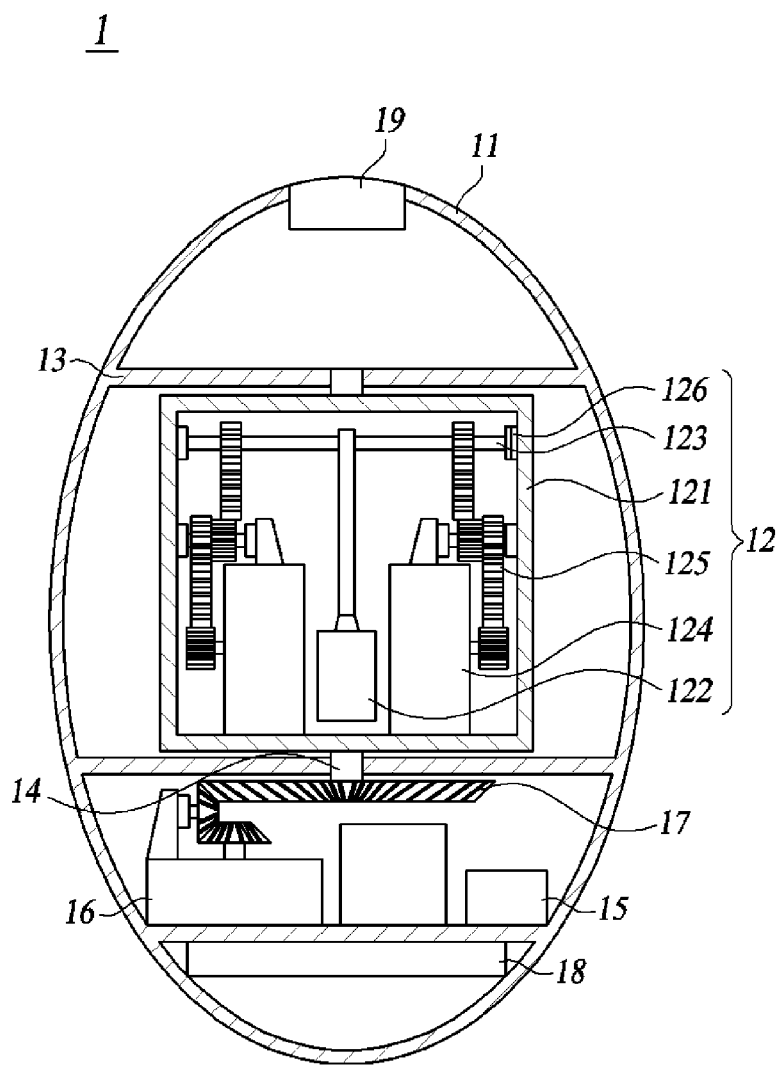
FIG. 2 is a cross-sectional view of the renewable energy generator according to at least an exemplary embodiment of the present disclosure.

FIG. 2 is a cross-sectional view of the renewable energy generator 1 according to at least an exemplary embodiment of the present disclosure.

As shown in FIG. 2, the renewable energy generator 1 may include a housing 11, a main generator unit 12, a frame 13, a main rotation shaft 14, a controller 15, an auxiliary motor 16, and an auxiliary gear unit 17 in whole or in part.

The housing 11 may be in the shape of a roly-poly toy or capsule to be configured to float in the coastal waters and distant seas. A solar panel may be provided on the surface of the housing 11. The housing 11 may have surface thereof provided with solar panels. The solar panels may be provided on the top portion of the surface of the housing 11, for example, the part which is not submerged in seawater. The housing 11 may have its upper end portion provided with a communication module 19. The communication module 19 may be an Ultra Wide Band-based (UWB-based) module for determining the absolute coordinates (x, y, z) of the renewable energy generator 1. For example, the communication module 19 may monitor the tilted state of the renewable energy generator 1 and determine the tilt angle to control the behavior of the renewable energy generator 1.

The main generator unit 12 includes an internal housing 121, a pendulum 122, a pendulum rotation shaft 123, main motors 124, gear units 125, and a rotating angle detector 126 in whole or in part.

The main generator unit 12 may generate electric power by converting wave energy into electrical energy by use of the movement of the pendulum 122. The pendulum 122 inside the main generator unit 12 moves in accordance with the movement of the waves, and the kinetic energy of the pendulum 122 is converted into electrical energy. The motion of the pendulum 122 may be transmitted to the main motors 124 via the pendulum rotation shaft 123 and the gear units 125. The main motors 124 may generate and store electrical energy in the battery 18. The main motors 124 may operate in an electricity generation mode for generating electrical energy.

The movement of the pendulum 122 in accordance with the changes in the waves may cause a moment of rotational inertia in the main generator unit 12. When the main generator unit 12 rotates due to the moment of rotational inertia, the rotation of the main generator unit 12 may be transmitted to the auxiliary motor 16 via the main rotation shaft 14 and the auxiliary gear unit 17. The main rotation shaft 14 may connect the main generator unit 12 rotatably to the frame 13 which is affixed to the housing 11. The auxiliary motor 16 may additionally produce electrical energy and store the electrical energy profit in the battery 18. At the instant time, the auxiliary motor 16 may operate in an electricity generation mode for producing electrical energy.

Because the movement of the pendulum 122 is made in only one direction, the irregular movement of the waves makes it difficult to steadily produce electric power. In other words, there is a problem in that it is difficult to produce electricity efficiently because steady generation of electricity is difficult in response to the fluctuation of the sea level.

The controller 15 of the renewable energy generator 1 according to at least an exemplary embodiment of the present disclosure may take into account parameters such as the intensity, speed, and frequency of the waves to control the renewable energy generator 1. For example, the controller 15 may increase the electricity generation efficiency of the renewable energy generator 1 by rotating the same by taking into account the intensity, speed, and frequency of the waves. The controller 15 may control the renewable energy generator 1 to use various forms of wave energy such as rolling, pitching, yawing, potential energy, and vertical and horizontal kinetic energy. The behavior of the renewable energy generator 1, which is obtained by use of the main motors 124 and the auxiliary motor 16 will be detailed below.

Figure 3:
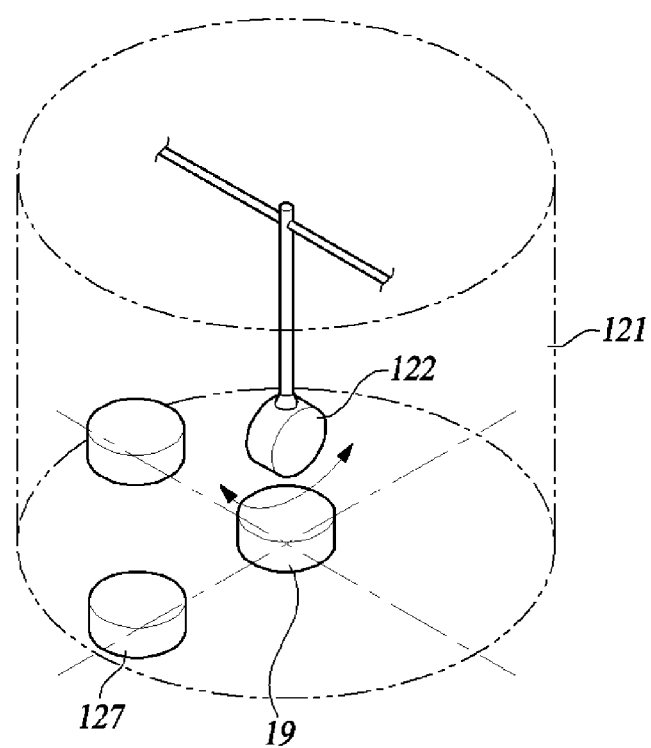
FIG. 3 is a schematic diagram showing the inside of a main generator unit of the renewable energy generator according to at least an exemplary embodiment of the present disclosure.

FIG. 3 is a schematic diagram showing the inside of a main generator unit 12 of the renewable energy generator 1 according to at least an exemplary embodiment of the present disclosure.

As shown in FIG. 3, the main generator unit 12 may further include one or more gyro detectors 127 and a communication module 19.

The gyro detector 127 refers to a detector which is configured to measure a change in the orientation of an object by use of the property of constantly maintaining its initially set direction, regardless of the rotation of the earth. The gyro detector 127 may be used to determine the intensity of the wave. For example, the intensity, frequency, speed, and pattern of the wave may be determined by use of the gyro detector 127. FIG. 3 illustrates that the gyro detectors 127 are located inside the main generator unit 12, although they may be located outside the main generator unit 12, and there may be additional gyro detectors 127 or some thereof may be deleted as necessary.

The present disclosure may use the communication module 19 to determine the positioning information of the renewable energy generator 1. The UWB-based communication module 19 may be used to determine the absolute coordinates of the renewable energy generator 1. For example, the present disclosure may monitor the tilt state of the renewable energy generator 1 and determine the tilted angle to control the behavior of the renewable energy generator 1. FIG. 3 illustrates that the communication module 19 is located centrally of the bottom portion of the main generator unit 12, although the location of the communication module 19 is not limited thereto, and it may be located outside the main generator unit 12.

Figure 4:
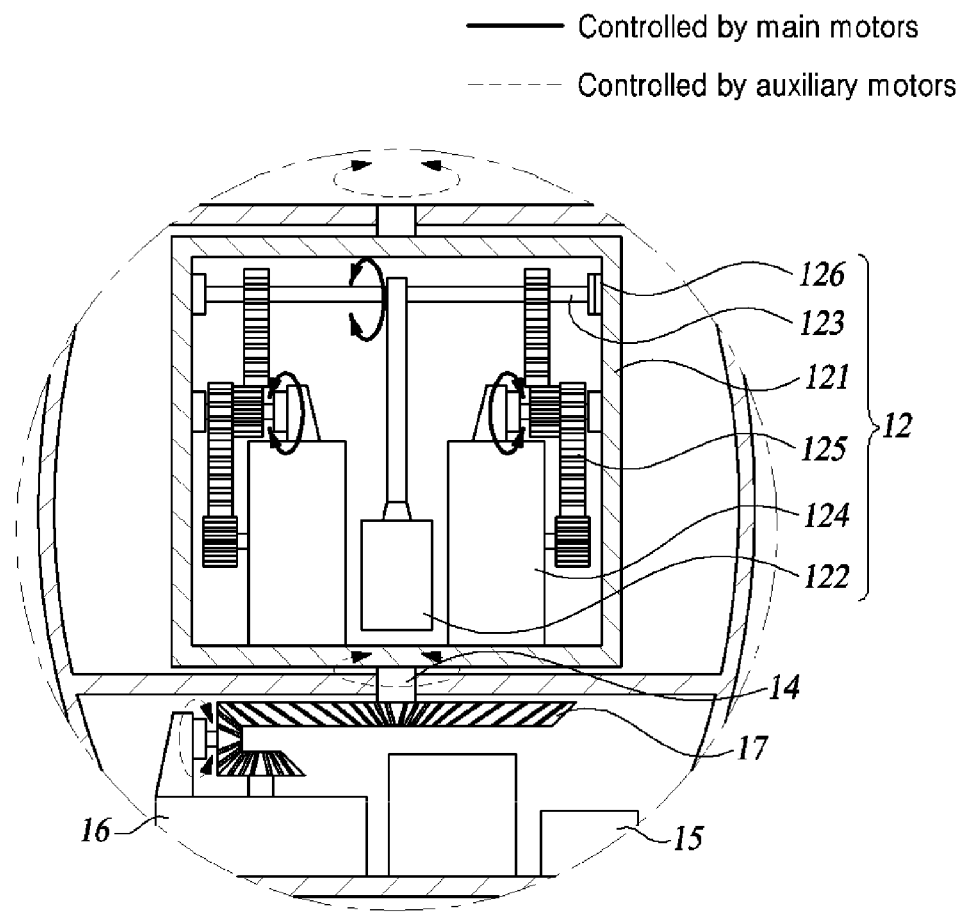
FIG. 4 is a view showing control targets of the renewable energy generator according to at least an exemplary embodiment of the present disclosure.

FIG. 4 is a view showing control targets of the renewable energy generator 1 according to at least an exemplary embodiment of the present disclosure.

Figure 5:
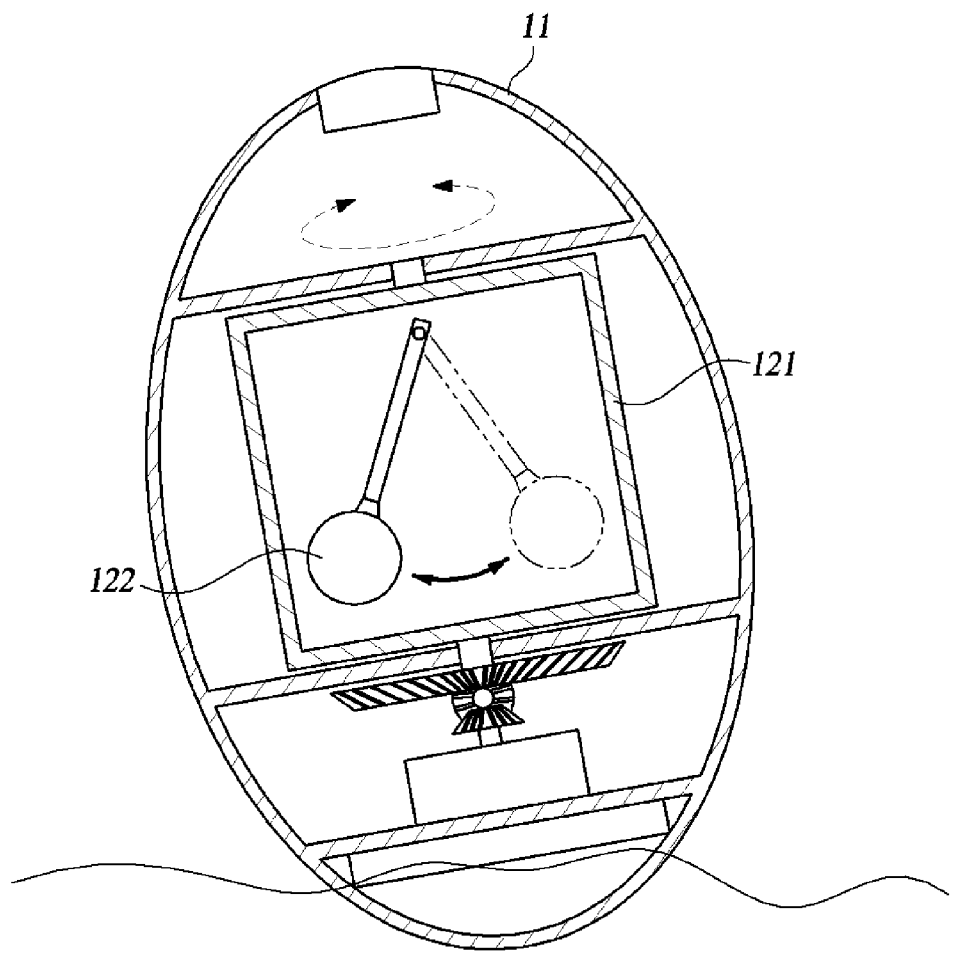
FIG. 5 is a view showing the behavior of the renewable energy generator according to at least an exemplary embodiment of the present disclosure.

FIG. 5 is a view showing the behavior of the renewable energy generator 1 according to at least an exemplary embodiment of the present disclosure.

As shown in FIG. 4 and FIG. 5, the renewable energy generator 1 of the present disclosure can generate an electrical energy profit by use of the main motors 124 and the auxiliary motor 16. The main motors 124 and the auxiliary motor 16 may be used as driving motors as well as electricity-generating motors. Upon determining that the pendulum 122 needs to perform a random operation, the controller 15 may switch the main motors 124 and the auxiliary motor 16 to a driving mode.

When the main motors 124 are driven, the gear units 125 rotate, and the pendulum rotation shaft 123 coupled to the gear units 125 rotates to operate the pendulum 122 (as illustrated by solid lines). When the auxiliary motor 16 is driven, the auxiliary gear unit 17 rotates, which in turn rotates the main rotation shaft 14 fixed to the auxiliary gear unit 17 and thereby rotates the main generator unit 12 (dashed lines). Slight movements of the pendulum 122 and the main generator unit 12 may cause the renewable energy generator 1 to behave, resulting in the generation of an electrical energy profit.

Figure 6:
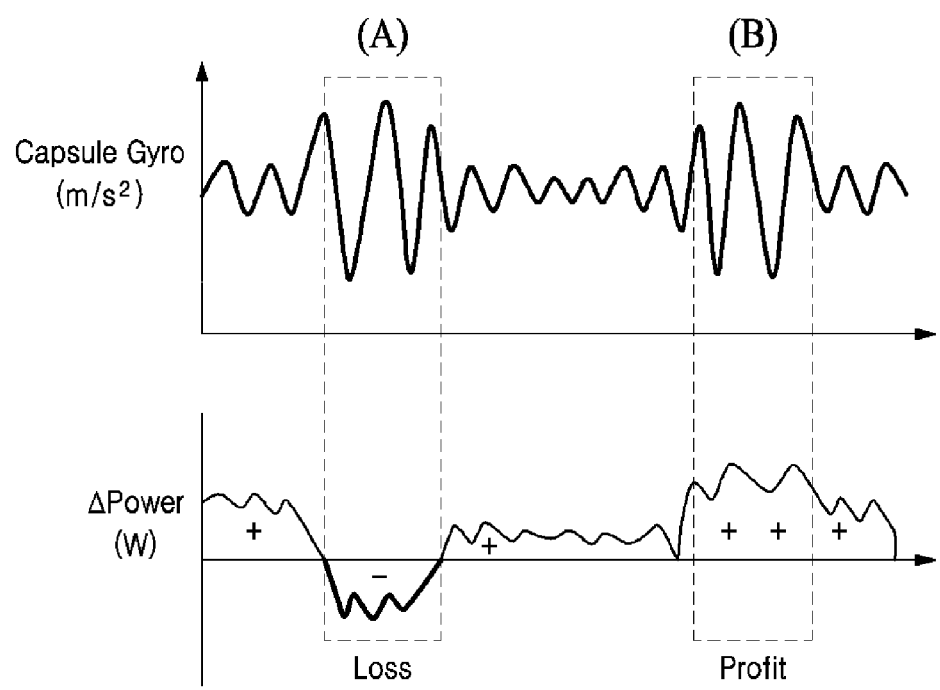
FIG. 6 is a graph showing an electrical energy profit and an electrical energy loss by the renewable energy generator according to at least an exemplary embodiment of the present disclosure.

FIG. 6 is a graph showing an electrical energy profit and an electrical energy loss by the renewable energy generator 1 according to at least an exemplary embodiment of the present disclosure.

In FIG. 6, one can see the measured value by the gyro detector 127 and the amount of electricity produced by the random operation of the pendulum 122 in the renewable energy generator 1. In both sections (a) and (b), the measured value by the gyro detector 127 varies greatly. The pendulum 122 may be randomly operated by driving the main motors 124 and the auxiliary motor 16, and the resultant behavior of the renewable energy generator 1 may change the measured value of the gyro detector 127 over a wide range.

The controller 15 may determine the profit of electrical energy additionally produced by the random operation of the pendulum 122 and the loss of electrical energy used for driving the main motors 124 and the auxiliary motor 16. The controller 15 may make a comparison between the energy amounts of the electrical energy profit and electrical energy loss. When there is more electrical energy loss than electrical energy profit, the driving of the main motors 124 and the auxiliary motor 16 may be stopped and they may be used only in the electricity generation mode. When the electrical energy profit exceeds the electrical energy loss, the main motors 124 and the auxiliary motor 16 may operate continuously.

In the graph of FIG. 6, section (a) exhibits a negative electricity production because of more electrical energy loss than electrical energy profit. Therefore, in section (a), the driving of the main motors 124 and the auxiliary motor 16 is stopped and they may be used only in the electricity generation mode. Section (b) exhibits a positive electricity output because the electrical energy profit is greater than the electrical energy loss. Therefore, in section (b), the main motors 124 and the auxiliary motor 16 may operate continuously.

Figure 7:
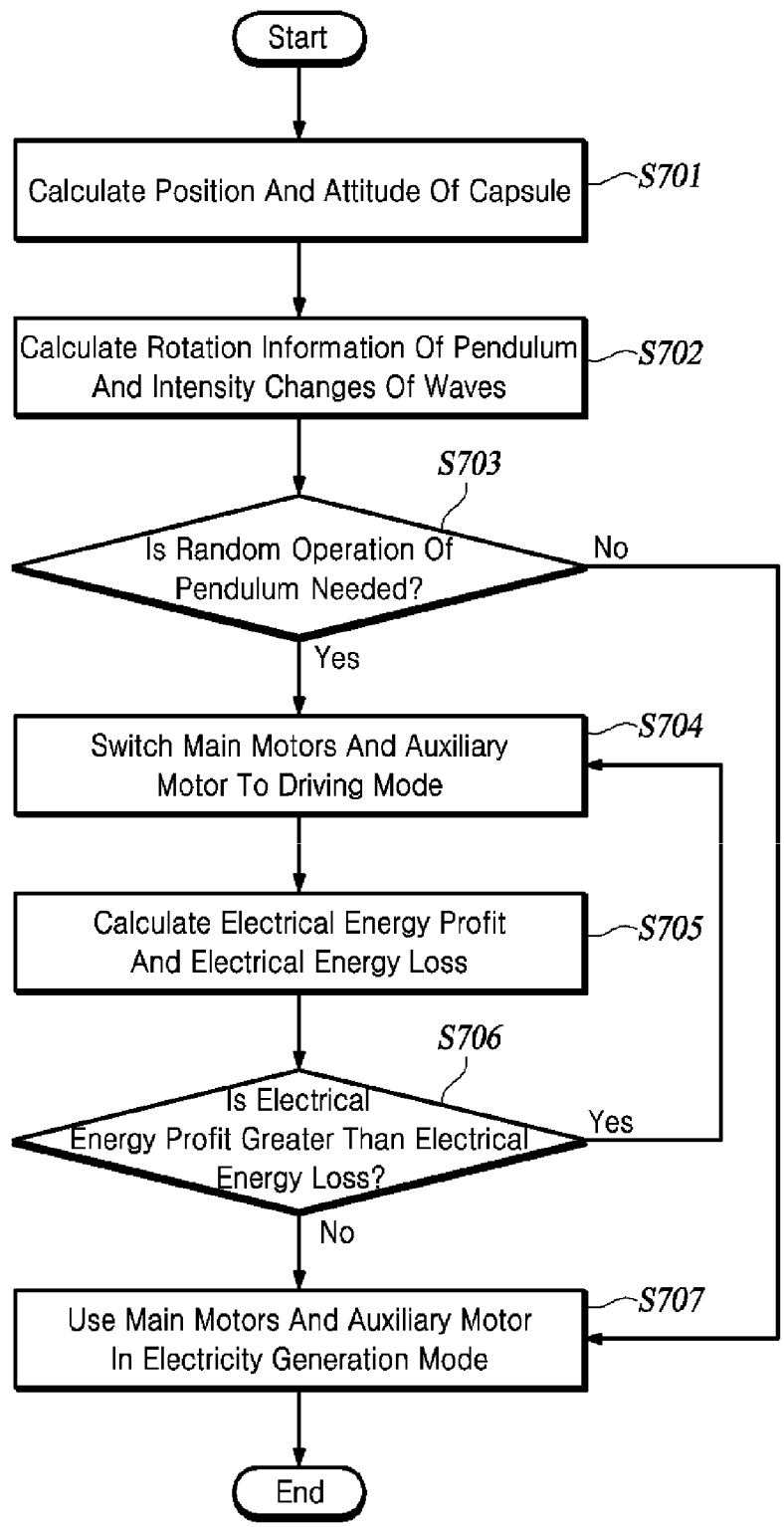
FIG. 7 is a flowchart of a method of generating renewable energy according to at least an exemplary embodiment of the present disclosure.

FIG. 7 is a flowchart of a method of generating renewable energy according to at least an exemplary embodiment of the present disclosure.

As shown in FIG. 7, the present disclosure can determine the position and attitude of the renewable energy generator 1 by use of the communication module 19 (S701). By use of the UWB-based communication module 19, the present disclosure can determine the absolute coordinates of the renewable energy generator 1 and determine the tilted state and angle of the renewable energy generator 1.

The renewable energy generator 1 may determine rotation information of the pendulum 122 by using the rotation angle detector 126 and determine the changes in the intensity of the waves by use of the gyro detector 127 (S702). The rotation angle detector 126 may determine the rotation information of the pendulum 122 by detecting the rotation angle and rotation speed of the pendulum rotation shaft 123. By use of the gyro detector 127, the present disclosure can determine the intensity, frequency, speed, and pattern of the waves.

The controller 15 may determine whether a random operation of the pendulum 122 is needed by use of the position and attitude of the renewable energy generator 1, the rotation information of the pendulum 122, and information on changes in the intensity of waves. (S703). For example, when a weak wave does not move the renewable energy generator 1 and the movement of the pendulum 122, the pendulum 122 may be randomly operated to generate an electrical energy profit.

Upon determining that the random operation of the pendulum 122 is needed, the controller 15 may switch the main motors 124 and the auxiliary motor 16 to the driving mode (S704). When the main motors 124 are driven, the gear units 125 rotate, which in turn rotates the pendulum rotation shaft 123 coupled to the gear units 125 to operate the pendulum 122. When the auxiliary motor 16 is driven, the auxiliary gear unit 17 rotates, which in turn rotates the main rotation shaft 14 fixed to the auxiliary gear unit 17 to rotate the main generator unit 12. The slight movements of the pendulum 122 and the main generator unit 12 may cause the renewable energy generator 1 to behave, resulting in the generation of an electrical energy profit. When the controller 15 determines that there is no need for the random operation of the pendulum 122, the main motors 124 and the auxiliary motor 16 may be used in the electricity generation mode (S707).

The controller 15 may determine the profit of electrical energy additionally produced due to the operation of the pendulum 122 and the loss of electrical energy used for driving the main motors 124 and the auxiliary motor 16 (S705). The controller 15 may make a comparison between the energy amounts of the electrical energy profit and the electrical energy loss (S706), and when the electrical energy profit is greater, the main motors 124 and the auxiliary motor 16 may operate continuously. When the electrical energy loss is more than the electrical energy profit, the present disclosure may stop the operations of the main motors 124 and the auxiliary motor 16 and use them exclusively in the electricity generation mode (S707).

According to at least an exemplary embodiment of the present disclosure, the renewable energy generator can perform highly efficiently with a pendulum operation and motors controlled by taking into account the intensity, speed, and frequency of the waves.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code that may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A renewable energy generator, comprising:
   a housing for floating in a body of water;
   a main generator unit mounted in the housing and including:
     an internal housing,
     a pendulum provided to pivotally move inside the internal housing,
     a pendulum rotation shaft connected to the pendulum and rotatably coupled to the internal housing,
     a main motor-generator operating in a first mode or a second mode, wherein the first mode is configured to convert kinetic energy of the pendulum into electrical energy and the second mode is configured to convert applied electrical energy to kinetic energy of the pendulum,
     a gear unit engaged both to the pendulum rotation shaft and to the main motor-generator;
   one or more frames fixed in the housing;
   a main rotation shaft fixed to the main motor-generator and rotatably coupling the main generator unit to at least one of the one or more frames, wherein the main rotation shaft is rotatable with respect to the one or more frames; and
   a controller configured to:
     determine whether an addition of electrical energy using an operation of the pendulum when the housing is moved by waves in the body of water is greater than a loss of electrical energy for driving the main motor-generator,
     control the main motor-generator to move the pendulum when the addition of electrical energy is greater than the loss of electrical energy, and
     control the main motor-generator to stop when the addition of electrical energy is less than the loss of electrical energy.

2. The renewable energy generator of claim 1, further including:
   an auxiliary gear unit located in the housing and outside the main generator unit, the auxiliary gear unit connected to the main rotation shaft; and
   an auxiliary motor-generator coupled to the auxiliary gear unit.

3. The renewable energy generator of claim 2, wherein the controller is further configured to control the auxiliary motor-generator to rotate the main rotation shaft when the main motor-generator is operated in the second mode.

4. The renewable energy generator of claim 2, further comprising:
   a rotation angle detector,
   wherein the controller is further configured to:
     detect a rotation angle and a rotation speed of the pendulum via the rotation angle detector;
     monitor intensity changes of the waves in the body of water based on the detected rotation angle and the detected rotation speed;
     determine, based on the detected rotation angle, the detected rotation speed, and the monitored intensity changes of the waves, whether the waves in the body of water do not move the pendulum; and
     upon determining that the waves in the body of water do not move the pendulum, switch the main motor-generator to the second mode and switch the auxiliary motor-generator to a driving mode.

5. The renewable energy generator of claim 2, wherein the main generator unit further includes:
   a rotation angle detector electrically connected to the controller and configured for detecting a rotation angle and a rotation speed of the pendulum rotation shaft; and
   a gyro detector electrically connected to the controller and configured for measuring intensity changes of the waves in the body of water.

* * * * *